A. L. BAILEY.
GAS STOVE.
APPLICATION FILED JULY 5, 1916.

1,237,275.

Patented Aug. 21, 1917.
2 SHEETS—SHEET 1.

Inventor
Arthur L. Bailey

By
Attorney

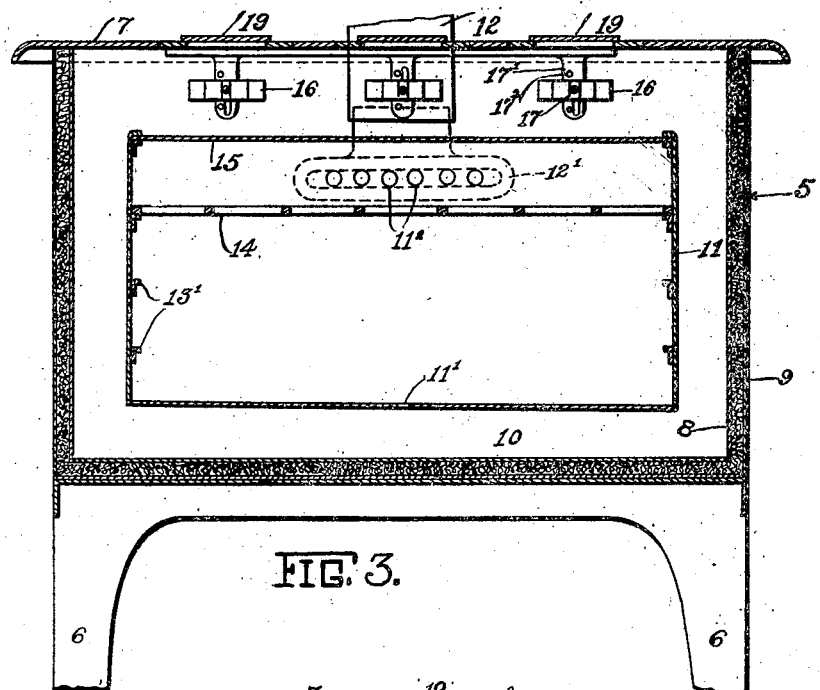
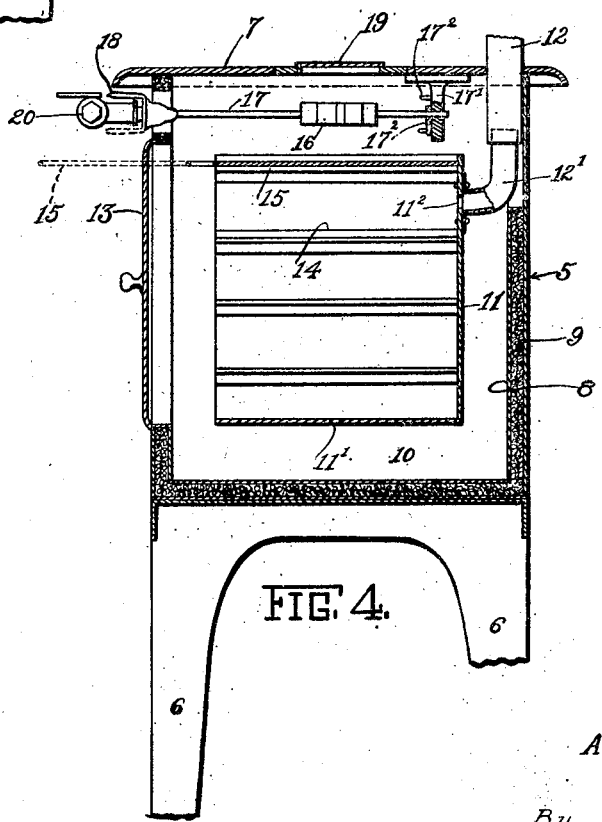

UNITED STATES PATENT OFFICE.

ARTHUR L. BAILEY, OF JAMAICA PLAIN, MASSACHUSETTS.

GAS-STOVE.

1,237,275.  Specification of Letters Patent.  Patented Aug. 21, 1917.

Application filed July 5, 1916. Serial No. 107,531.

*To all whom it may concern:*

Be it known that I, ARTHUR L. BAILEY, a citizen of the United States, residing at Jamaica Plain, county of Suffolk, Commonwealth of Massachusetts, have invented certain new and useful Improvements in Gas-Stoves, of which the following is a specification.

This invention relates to gas stoves, and has for its object to provide in a simple and convenient construction a range with which all ordinary cooking, baking, broiling and roasting operations may be practised with the greatest economy of fuel. My invention depends upon the utilization of the heat generated by a single set of burners to the greatest possible extent, whereby all the usual cooking operations may be performed in a single range and by the single set of burners. In gas stoves as usually constructed, individual and independent burners are provided for heating the independent baking and broiling compartments, and for boiling, frying and the like. My invention utilizes the heat generated by the single set of cooking burners and which would otherwise be wasted, to perform the baking and broiling operations, and thus obviates the necessity for the usual baking and broiling burners as well as a separate broiling compartment.

In carrying out my invention the usual cooking burners have their usual positions above the oven, but the heat from these burners is trapped and caused to circulate about and through the oven, whereby to heat the oven to a degree at which baking or broiling may be accomplished. The oven itself is so constructed that it may be used either as a baking compartment or for broiling purposes, thus not only dispensing with the usual burners for heating the oven but also dispensing with the usual separate broiling compartment and individual burners customarily provided therefor, and utilizing the heat from the cooking burners to perform at different times both the baking and the broiling operations.

In addition, the cooking burners may be used for their ordinary function of frying or broiling even when baking or broiling, and by means of a closed top or cover the entire surface of the range is converted into a cooking or warming surface upon which a large number of receptacles may be heated. My range, moreover, is relatively small and compact in size, as compared with the usual gas stove equipped with separate oven and broiler compartments, and may be used at a far lesser operating expense than the usual stove.

The construction and operation of my range is fully described in the specification which follows. In the drawings accompanying that specification I have shown an embodiment which well illustrates the principles of my invention. Throughout the specification and drawings, like reference characters are employed to indicate corresponding parts, and in the drawings:

Fig. 3 is a longitudinal section through the stove, and

Fig. 4 is a transverse section thereof, and indicating in dotted lines the removable top or closure of the oven as a broiling compartment in which the food to be broiled is exposed to the direct action of the burners.

Figure 1:
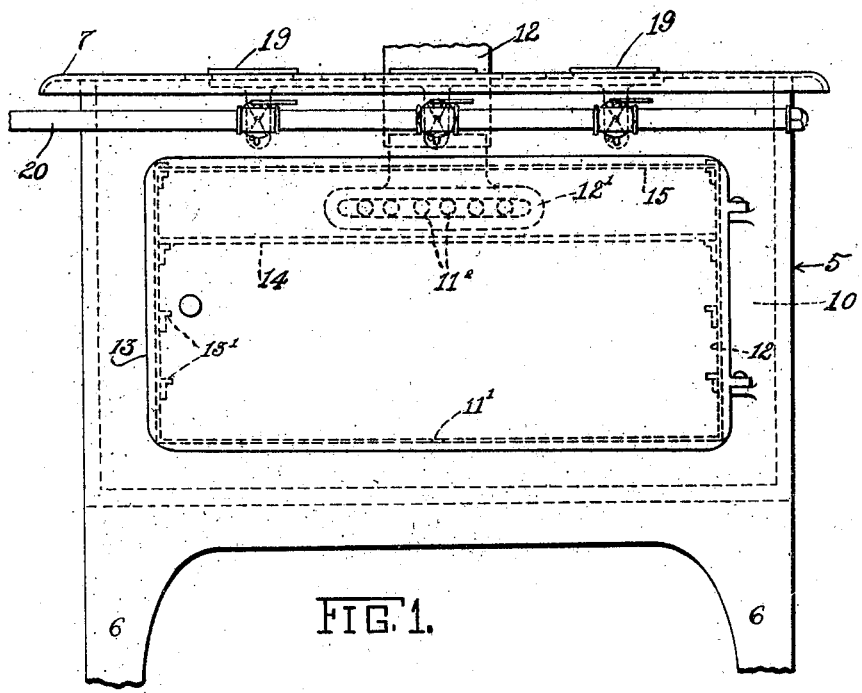
Figure 1 is a front elevation of a gas stove in accordance with my invention.
Figure 2:
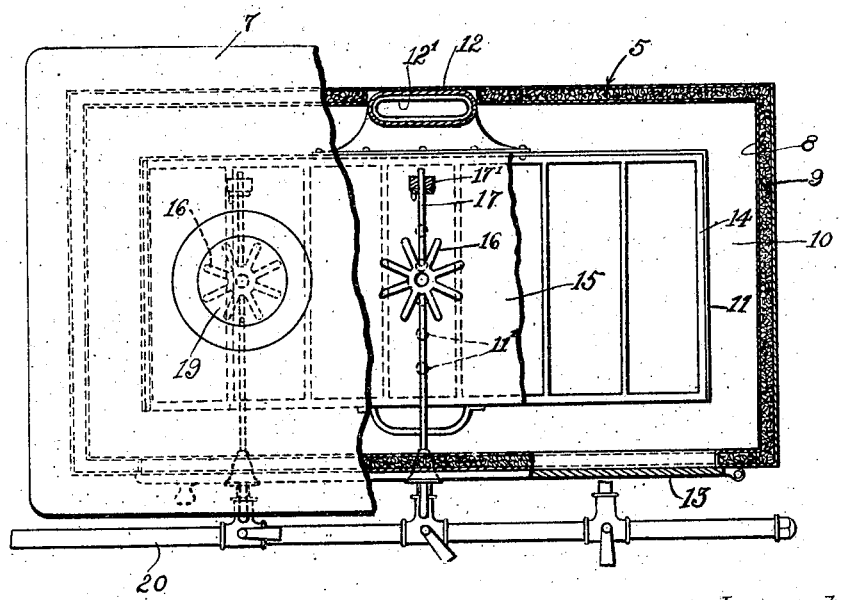
Fig. 2 is a plan view thereof partially broken away to illustrate the interior construction.

The stove 5 here shown is of general rectangular shape to occupy the minimum space and is raised from the floor to any suitable height by means of legs 6 at each corner. It is provided with a top 7 of greater area than the top of the stove so as to overlap at the sides and ends. Arranged within and spaced from the wall of the stove proper is an internal member 8 providing with the stove wall proper a heat insulating jacket which may be filled with any suitable heat insulating material 9 as asbestos or the like.

Arranged within the jacketed structure thus provided and spaced therefrom to define a continuous heat circulating space 10 is a compartment 11 which constitutes both the oven and the broiling chambers. The heat circulating passage 10 extends continuously about the compartment 11, whereby a continuous circulation of heated air from the burners 16 may be had around the oven.

One of the walls of the compartment 11, here shown as the bottom wall, is perforated as indicated at 11¹ to permit the heated air to circulate through as well as about the oven. The rear wall of the compartment 11 is provided with a series of ports 11² leading into a flanged collar 12¹ secured to said wall and connecting with a flue 12, whereby to carry off smoke and the like from said compartment. That side of the compartment 11 opposite the front of the stove as here shown in Fig. 1 is open to permit food to be inserted into the compartment 11, and this opening is adapted to be closed by a door 13 hinged to the outer wall of the stove proper. The lateral walls of the compartment 11 are provided with a series of spaced guides 13¹ constituting supports for the usual baking pans, not shown, and for a broiling pan indicated at 14, Fig. 1.

The top of the compartment 11 is closed by a slidable cover or baffle 15, whereby when the compartment 11 is used as an oven for baking purposes the heat supplied from the series of burners 16 arranged above the cover 15 and in the heat circulating passage 10 may circulate about the compartment 11 and through it by means of the holes 11¹. The burners 16 are reversibly mounted so as to direct their flame either upwardly toward the fixed top 7 of the stove or downwardly toward the removable cover 15. For this purpose the burners may conveniently be carried by shafts 17 arranged transversely of the stove in suitable bearings 17¹ depending from the top 7. Suitable stops 17² are provided to limit the reversing movement of the shafts (see Fig. 4) and each shaft is provided beyond the front wall of the stove with an operating lever or equivalent device 18 whereby the shafts may be conveniently turned to reverse the burners when desired.

When the range is used to bake, the burners are preferably reversed in order to direct their heat downwardly and through and about the compartment 11, and the closure 15 is disposed in its normal full line position, shown in Fig. 4 to form of the compartment a closed oven. When it is desired to broil food, the closure 15 is removed by drawing it transversely through the opening normally covered by the oven door 13 as indicated in dotted lines, Fig. 4, and the food supported on the broiler 14 is exposed to the direct action of the downwardly directing burners. In the use of the stove for the ordinary functions of cooking, such as broiling or frying, the receptacles are placed directly over the burners which may be inverted to direct their flames upwardly.

In order that the receptacles may be most effectively exposed to the action of the burners in this adaptation of my stove while at all other times the heat generated by the burners is confined and utilized to warm the oven, the top 7 has suitable holes therein disposed over the burners and adapted to be displaceably covered by a series of covers 19. In addition therefore, to heating the oven compartment 11, the burners heat the entire closed top 7 of the stove so that any portion of this top may be utilized as a cooking surface. The covers 19 may be displaceably mounted with relation to the burners in any desired manner, or they may be wholly removable as in the case of the ordinary stove lid. The gas supply pipe for the burners is indicated at 20 and the connections from said pipe to the individual burners are made and controlled in the usual manner. The burners themselves are of any approved construction and the mechanism for reversing them may be of any desired type. In addition to its function of closing the top of the oven compartment 11, the removable cover 15 also acts as a drip pan to receive any matter which may boil over when the stove is used in the ordinary cooking functions.

Various modifications in the form and construction of my invention may obviously be resorted to if within the limits of the appended claims.

What I therefore claim and desire to secure by Letters Patent is:

1. In a stove, a compartment spaced from the stove walls to provide a continuous heat circulating passage and having an open top, a top spaced from and overlapping said compartment and provided with a cooking opening, a burner arranged in the space between said top and compartment and just below the top of the stove and in effective relation to said cooking opening, and a converting member removably arranged between said open top of the compartment and the burner and adapting said compartment for use for broiling or baking, by means of the heat from said burner only, according to the position of said member with relation to said open top.

2. In a stove having insulated walls and having a top constituting a cooking surface, a compartment arranged within and spaced from said walls and defining therewith a continuous heat circulating passage, a burner reversibly mounted in said heat circulating passage between said top and said compartment, and a removable converting member constituting when in one position a closure for the top of the compartment adjacent the burner, whereby to adapt said compartment for use for broiling or baking, by means of the heat from said burner only, according to the position of said member with relation thereto.

3. In a stove having insulated walls and having a top constituting a cooking surface, a compartment arranged within and spaced from said walls and defining therewith a continuous heat circulating passage having communication with the interior of said compartment and with a source of draft, a burner reversibly mounted in said heat circulating passage between said top and said compartment, and a removable converting member constituting when in one position a closure for the top of the compartment adjacent the burner whereby to adapt said compartment for use for broiling or baking, by means of the heat from said burner only, according to the position of said member with relation thereto.

4. A stove having insulated walls and having a top having a cooking opening provided with a displaceable cover, a compartment having a removably covered top and arranged within said insulated walls in spaced relation thereto and defining therewith a continuous heat circulating passage having direct communication with the interior of said compartment and having connection with a source of draft, said compartment constituting a broiling or a baking oven according to the position of the removable cover thereof, and a burner arranged in the heat circulating passage above said displaceably covered top of the compartment and reversible to direct its heat downwardly toward said top or upwardly toward said covered cooking opening of the stove top and constituting the only source of heat for said compartment and stove top.

5. A gas stove having double walls with heat insulating material therebetween, an oven compartment having an open top and arranged within and spaced from said walls and defining therewith a heat circulating passage having direct communication with the interior of the compartment and having connection with a source of draft, a combination baffle and drip member removably arranged over said open top of the compartment and adapting said compartment for broiling or baking, by means of the heat from said burner only, according to the position thereof with relation to said open top, and a burner arranged in the heat circulating passage above said baffle member.

6. In a stove, a convertible baking and broiling compartment adapted to perform at different times both functions, and consisting of an oven member arranged within and spaced from the walls of the stove to define a heat circulating passage continuously about said member, said oven member having an open front permitting access thereto and permitting heat from said passage to enter thereinto, and having a removably covered top, a burner arranged in said passage opposite said removably covered top, and wholly outside of said oven member and constituting the only source of heat for said oven member, and a sliding cover for said top disposed between it and the source of heat and designed to close said top of the oven member when in one position and form of said member a baking compartment and adapted when in the other position to convert said oven member into a broiling compartment in which the contents are exposed to direct heat from said source of heat.

7. In a stove, a compartment spaced from the stove walls to provide a continuous heat circulating passage and having an open top and having in a wall thereof a plurality of ports, an elbow member disposed in the space between said compartment and the stove walls and having an intake mouth coöperating with said ports, a flue engaging with the opposite end of said member, a heat source arranged in the heat circulating passage opposite said removably covered top of the compartment, and a removable cover arranged between said open top of the compartment and the heat source and adapting said compartment for use for broiling or baking according to the position of said member with relation to said open top.

8. In a stove, a compartment spaced from the stove walls to provide a continuous heat circulating passage and having a removably covered top, a heat source arranged opposite to said top and in a portion of said passage, and a removable converting member having a covering position between said heat source and said compartment top adapting said compartment for baking by means of the circulated heat from said heat source, and having a removed position exposing the contents of the compartment to the direct action of the heat source through said open top for the purpose of broiling.

In testimony whereof I affix my signature in presence of two witnesses.

ARTHUR L. BAILEY.

Witnesses:
  MARY P. WOTHERSPOON,
  VICTORIA LOWDEN.